United States Patent
Hart

(10) Patent No.: US 10,760,712 B2
(45) Date of Patent: *Sep. 1, 2020

(54) FLUID REGULATORS

(71) Applicant: Emerson Process Management Regulator Technologies, Inc., McKinney, TX (US)

(72) Inventor: Justin Wade Hart, Melissa, TX (US)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 108 days.

This patent is subject to a terminal disclaimer.

(21) Appl. No.: 16/042,412

(22) Filed: Jul. 23, 2018

(65) Prior Publication Data

US 2018/0328516 A1 Nov. 15, 2018

Related U.S. Application Data

(62) Division of application No. 14/675,448, filed on Mar. 31, 2015, now Pat. No. 10,054,247.

(51) Int. Cl.
| | |
|---|---|
| *F16K 47/00* | (2006.01) |
| *G05D 16/02* | (2006.01) |
| *G05D 16/06* | (2006.01) |
| *F16K 5/08* | (2006.01) |

(52) U.S. Cl.
CPC .............. *F16K 47/00* (2013.01); *F16K 5/08* (2013.01); *G05D 16/02* (2013.01); *G05D 16/0688* (2013.01)

(58) Field of Classification Search
CPC ....... F16K 5/08; F16K 47/00; G05D 16/0688; G05D 16/02

USPC .................................................. 137/825, 803
See application file for complete search history.

(56) References Cited

U.S. PATENT DOCUMENTS

| | | |
|---|---|---|
| 2,826,213 A | 3/1958 | Wright |
| 4,058,141 A | 11/1977 | Hasinger et al. |
| 4,180,100 A | 12/1979 | Kolb et al. |
| 4,292,998 A | 10/1981 | Winiasz |

(Continued)

FOREIGN PATENT DOCUMENTS

WO 2012061002 5/2012

OTHER PUBLICATIONS

Diyefi, "Biometrics: Synthetic Shark Skin Texture for better flow?", [http://forum.diyefi.org/viewtopic.php?f=15&t=203], accessed on Mar. 23, 2015, 4 pages.

(Continued)

*Primary Examiner* — Umashankar Venkatesan
(74) *Attorney, Agent, or Firm* — Hanley, Flight & Zimmerman, LLC

(57) ABSTRACT

Fluid regulators are disclosed. An example apparatus includes a vale body, a valve seat, and protrusions. The valve body has an inlet and an outlet. The valve seat is located within the valve body and is positioned between the inlet and the outlet. The protrusions are formed by and extend along an inner wall of the valve body between the valve seat and the outlet, and end adjacent the outlet. At least one of the protrusions is spaced relative to others of the protrusions. The protrusions are to increase a uniformity of a flow pattern of fluid flowing through a cross-section of the outlet. Each of the protrusions has a central axis oriented perpendicularly to a corresponding surrounding portion of the inner wall.

19 Claims, 10 Drawing Sheets

(56) References Cited

U.S. PATENT DOCUMENTS

| | | | |
|---|---|---|---|
| 4,402,485 | A | 9/1983 | Fagerlund |
| 4,479,509 | A | 10/1984 | Dear et al. |
| 4,512,548 | A | 4/1985 | Keller |
| 4,735,224 | A | 4/1988 | Pluviose |
| 4,889,158 | A | 12/1989 | Rice et al. |
| 5,540,415 | A | 7/1996 | Yamamoto et al. |
| 9,229,458 | B2 | 1/2016 | Hawkins et al. |
| 2009/0261281 | A1 | 10/2009 | Mevius et al. |
| 2015/0355642 | A1 | 12/2015 | Sanders et al. |

OTHER PUBLICATIONS

International Searching Authority, "International Search Report and Written Opinion," issued in connection with International Patent Application No. PCT/2016/025175, dated Jul. 7, 2016, 9 pages.

International Bureau, "International Preliminary Report on Patentability," issued in connection with International Patent Application No. PCT/2016/025175, dated Oct. 3, 2017, 7 pages.

United States Patent and Trademark Office, "Non-Final Office Action," issued in connection with U.S. Appl. No. 14/675,448, dated Jul. 27, 2016, 12 pages.

United States Patent and Trademark Office, "Final Office Action," issued in connection with U.S. Appl. No. 14/675,448, dated Jan. 26, 2017, 10 pages.

United States Patent and Trademark Office, "Advisory Action," issued in connection with U.S. Appl. No. 14/675,448, dated Mar. 24, 2017, 4 pages.

United States Patent and Trademark Office, "Non-Final Office Action," issued in connection with U.S. Appl. No. 14/675,448, dated May 5, 2017, 11 pages.

United States Patent and Trademark Office, "Final Office Action," issued in connection with U.S. Appl. No. 14/675,448, dated Nov. 2, 2017, 13 pages.

United States Patent and Trademark Office, "Advisory Action," issued in connection with U.S. Appl. No. 14/675,448, dated Jan. 29, 2018, 5 pages.

United States Patent and Trademark Office, "Non-Final Office Action," issued in connection with U.S. Appl. No. 14/675,448, dated Mar. 16, 2018, 15 pages.

United States Patent and Trademark Office, "Notice of Allowance and Fee(s) Due," issued in connection with U.S. Appl. No. 14/675,448, dated May 21, 2018, 11 pages.

FLUID REGULATORS

RELATED APPLICATIONS

This disclosure arises from a division of U.S. patent application Ser. No. 14/675,448, filed Mar. 31, 2015, entitled "Fluid Regulators," the entirety of which is hereby incorporated herein by reference.

FIELD OF THE DISCLOSURE

This disclosure relates generally to fluid control devices and, more particularly, to fluid regulators.

BACKGROUND

Fluid regulators may receive a relatively high pressure at an inlet and provide a relatively lower set control pressure at an outlet. In some instances, the flow through the outlet may vary based on the downstream demand of the system to which the fluid regulator is coupled.

SUMMARY

Fluid regulators are disclosed. In some disclosed examples, an apparatus comprises a vale body, a valve seat, and protrusions. In some disclosed examples, the valve body has an inlet and an outlet. In some disclosed examples, the valve seat is located within the valve body and is positioned between the inlet and the outlet. In some disclosed examples, the protrusions are formed by and extend along an inner wall of the valve body between the valve seat and the outlet, and end adjacent the outlet. In some disclosed examples, at least one of the protrusions is spaced relative to others of the protrusions. In some disclosed examples, the protrusions are to increase a uniformity of a flow pattern of fluid flowing through a cross-section of the outlet. In some disclosed examples, each of the protrusions has a central axis oriented perpendicularly to a corresponding surrounding portion of the inner wall.

In some disclosed examples, an apparatus comprises a valve body, a valve seat, protrusions, and a pitot tube. In some disclosed examples, the valve body has an inlet and an outlet. In some disclosed examples, the valve seat is located within the valve body and is positioned between the inlet and the outlet. In some disclosed examples, the protrusions are formed by and extend along an inner wall of the valve body between the valve seat and the outlet, and end adjacent the outlet. In some disclosed examples, at least one of the protrusions is spaced relative to others of the protrusions. In some disclosed examples, the pitot tube has a sensing end located downstream from the valve seat and upstream from the protrusions.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Some known fluid regulators exhibit unpredictable flow and/or pressure at their outlets. If the flow pattern of a fluid exiting the outlet of a regulator is relatively unpredictable, a sensor (e.g., a pitot tube) positioned downstream of the regulator may be unable to provide accurate and/or reliable readings. Such inaccurate readings may result in the regulator under traveling and/or over traveling and, more generally, for the set downstream pressure to not be consistently maintained.

In contrast to some of these known regulators, using the examples disclosed herein, outlet flow is caused to be more predictable and/or repeatable enabling downstream sensors to provide more accurate readings and increase the usable capacity of the regulator. For example, to increase the predictability of the outlet flow, reduce boost and/or increase delivery pressure, the outlet paths of the example fluid regulators disclosed herein include surface structures that cause stratification of the fluid flow. In some examples, stratification of the fluid flow enables the flow pattern through the outlet path to be predictable and/or repeatable over various pressure drops (e.g., a 10 pounds per square inch (PSI) pressure drop, a 90 PSI pressure drop, etc.).

In some examples, the example surface structures within the outlet flow paths increase the pressure of the fluid flow in the middle of the outlet path by reducing fluid velocity and decrease the pressure of the fluid flow immediately adjacent the walls of the outlet path by increasing fluid velocity. Thus, by increasing the fluid velocity immediately adjacent the walls of the outlet path and decreasing the fluid velocity in the middle of the outlet path, the example surface structures enable fluid pressure and/or velocity across a cross-section of the outlet to be relatively consistent and/or uniform. In some examples, the surface structures within the outlet path include concave dimples, convex dimples, apertures, protrusions and/or texturing such as sharkskin texturing. The surface structures may be disposed in an irregular pattern, a random pattern and/or a consistent or regular pattern.

Figure 1:
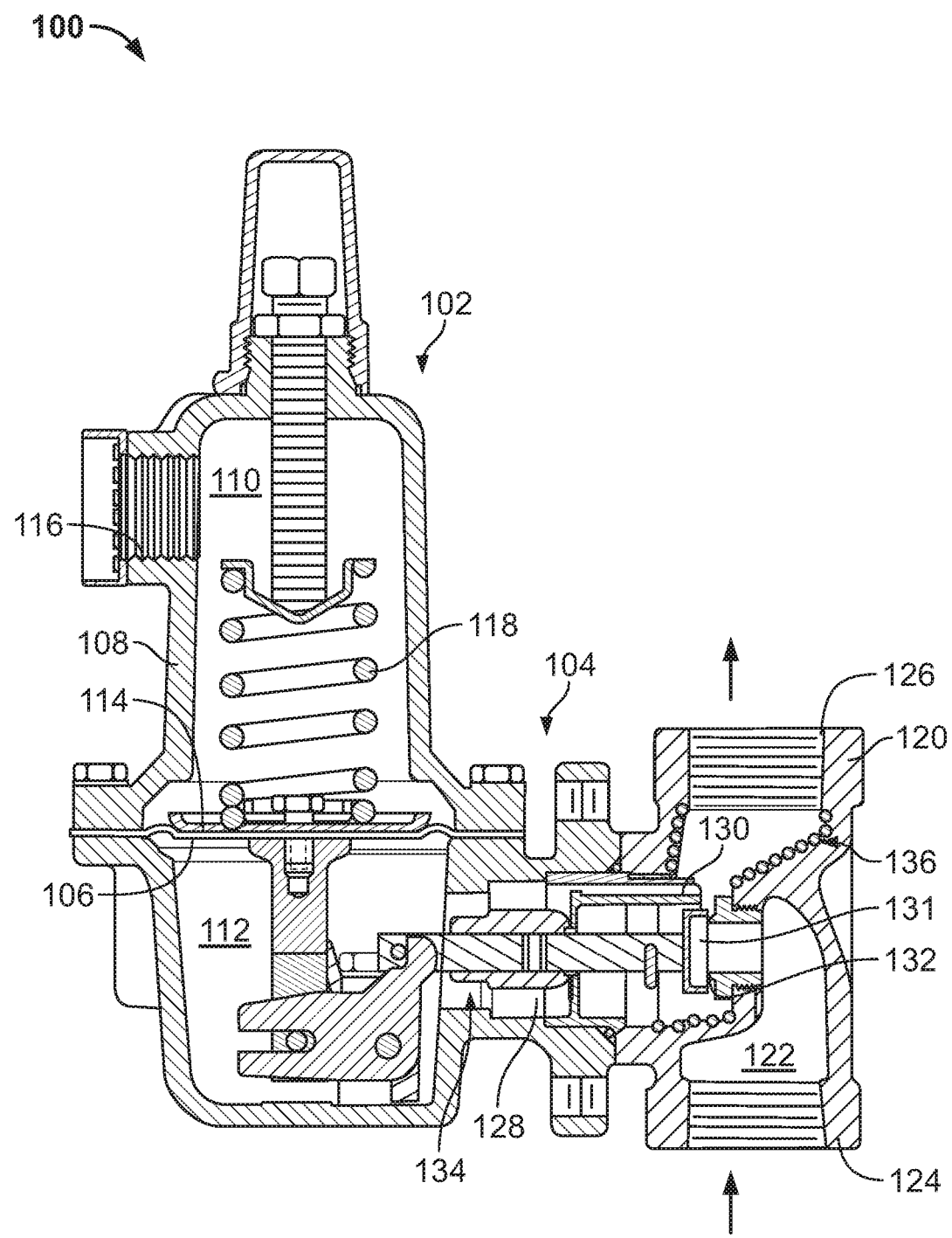
FIG. 1 shows an example fluid regulator in accordance with the teachings of this disclosure.

FIG. 1 shows an example regulator 100 that includes an actuator 102 coupled to a regulator valve 104. The actuator 102 includes a diaphragm 106 that is captured within an actuator housing 108 to define a loading chamber 110 and a sensing chamber 112. To provide a control load and/or pressure to a first side 114 of the diaphragm 106, the loading chamber 110 receives a control fluid, via an inlet port 116, and houses a spring 118 that acts against the diaphragm 106. In some examples, the control load and/or pressure provided by the spring 118 and/or the control fluid corresponds to a desired outlet pressure provided by the regulator 100.

The regulator valve 104 of FIG. 1 includes a valve body 120 defining a fluid passageway 122 between an inlet 124 and an outlet 126. In this example, the valve body 120 is coupled to the actuator housing 108 such that a throat 128 of the valve body 120 is in fluid communication with the sensing chamber 112 to enable the sensing chamber 112 and/or a pitot tube 130 disposed within the throat 128 to sense the pressure at the outlet 126 of the valve body 120. To control fluid flow through the valve body 120, a plug 131 is disposed within the passageway 122 to move relative to a valve seat and/or orifice 132. In this example, the plug 131 is coupled to the diaphragm 106 via linkage 134. However, the plug 131 may be coupled to the diaphragm 106 in any suitable way.

In operation, in the example of FIG. 1, the diaphragm 106 moves the valve plug 131, via the linkage 134, in response to a pressure differential across the diaphragm 106. When the downstream demand increases and causes the downstream pressure to decrease below the control load and/or pressure, a pressure differential across the diaphragm 106 and the spring 118 force causes the diaphragm 106 to move toward the sensing chamber 112, thereby moving the valve plug 131 away from the valve seat 132 to enable fluid flow through the passageway 122. When the downstream demand decreases and causes the downstream pressure to increase above the control load and/or pressure, the pressure differential across the diaphragm 106 causes the diaphragm 106 to move toward the loading chamber 110, thereby moving the valve plug 131 toward the valve seat 132 to prevent or reduce fluid flow through the passageway 122.

The regulator 100 may be categorized by a certain capacity rating or accuracy classification based on the ability of the regulator 100 to maintain an outlet pressure at the set control pressure when the regulator 100 is exposed to a range of pressure differentials and, thus, fluid flow rates. When the regulator 100 provides a downstream outlet pressure that deviates from the set control pressure, the regulator 100 is no longer controlling within that particular operating parameter and its accuracy classification or capacity is significantly degraded.

For example, when the regulator 100 is exposed to high inlet pressures or high pressure differentials, the regulator 100 may create boost when the downstream pressure suddenly increases and the fluid flows through the passageway 122 at a relatively high velocity. Fluid flow having a relatively high velocity may result in unpredictable pressure areas and/or zones within the throat 128 and/or the outlet 126 to deviate from the downstream pressure. Depending on the pressure drop across the diaphragm 106, the location of these pressure areas and/or zones may shift, thereby making the ability to accurately sense the pressure using the pitot tube 130 difficult.

For example, in some known regulators (i.e., not the regulator 100 of FIG. 1) when a first pressure drop is present across the orifice 132, vertical pressure gradients that run transverse to a longitudinal axis of the outlet 126 define a first pressure zone may form in a first location within the outlet 126 and, when a second pressure drop is present across the diaphragm 106, vertical pressure gradients that differently define the first pressure zone may form in a second location within the outlet 126. As a result of the movement of these pressure areas and/or zones and/or the movement of the vertical pressure gradients, in some examples, placing the pitot tube 130 in a position that obtains reliable pressure readings when the regulator 100 is exposed to different pressure drops is difficult. If the measured pressure is inaccurate (e.g., a lower pressure than the actual outlet pressure), the regulator 100 may deviate from the control pressure, thereby causing the regulator 100 to have a lower capacity rating due to, for example, poor accuracy of the pressure measurements.

In contrast to the issues encountered with some known regulators (i.e., not the regulator 100 of FIG. 1), to decrease the boost within the outlet 126, the examples disclosed herein include surface structures and/or texturing 136 within the outlet 126 that cause the fluid flow within the outlet 126 to have a more consistent and/or uniform velocity, to have more consistent and/or uniform pressure gradients and/or to have a more consistent and/or uniform pressure across a cross-section of the outlet 126. The surface structures 136 may include apertures, concave dimples, convex dimples, sharkskin surface structures, texturing, etc. However, the surface structures 136 may be any suitable structure, texture and/or pattern that reliably controls the flow of fluid (e.g., gas, liquid, slurry) flowing through the regulator 100.

In some examples, the surface structures 136 are configured to increase turbulence and velocity of the fluid flow immediately adjacent the walls of the outlet 126 and to decrease the turbulence and velocity of the fluid flow in the middle of outlet 126 such that the velocity and/or pressure of the fluid flow across an entire cross-section of the outlet 126 is relatively consistent or uniform. Additionally or alternatively, in some examples, the surface structures 136 are configured to increase a number of horizontal pressure gradients that run along a longitudinal axis of the outlet 126 and to decrease a number of vertical pressure gradients that run transverse to the longitudinal axis of the outlet 126. In contrast to the vertical pressure gradients present in examples that do not include the surface structures 136 disclosed herein, horizontal pressure gradients that run along a longitudinal axis of the outlet 126 have a tendency to remain in a relatively consistent position even when the regulator 100 experiences different pressure drops across the diaphragm 106. Thus, using the examples disclosed herein, the pitot tube 130 may be reliably positioned within a pressure area and/or zone (e.g., within a horizontal pressure zone) regardless of the pressure drop across the orifice 132. Reliable placement of the pitot tube 130 enables relatively more accurate pressure measurements to be obtained, which enables the example regulator 100 to have a higher capacity rating due to, for example, improved accuracy of the pressure measurements.

Figure 2:
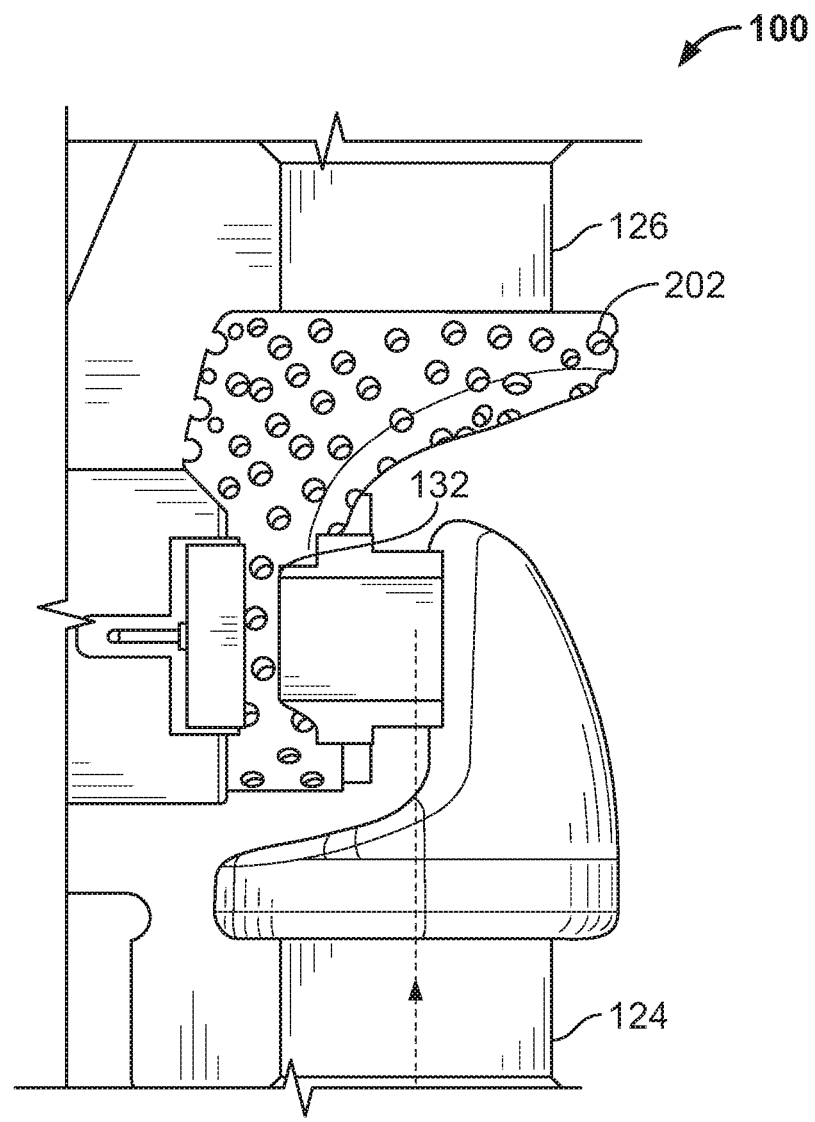
FIG. 2 shows a portion of the example fluid regulator of FIG. 1 including an example first aperture pattern defined within an example outlet flow path.

FIG. 2 shows a partial view of the example regulator 100 of FIG. 1 including example apertures 202 (e.g., shallow recesses) that can be used to implement the example surface structures 136 of FIG. 1. In some examples, the apertures 202 are randomly dispersed within the outlet 126. In some examples, the apertures 202 increase a flow capacity through the outlet 126 by, for example, causing the velocity across a cross-section of the outlet 126 to be relatively consistent. In some examples, the apertures 202 cause a pressure and/or a pressure field across a cross-section of the outlet 126 to be relatively consistent.

Figure 3:
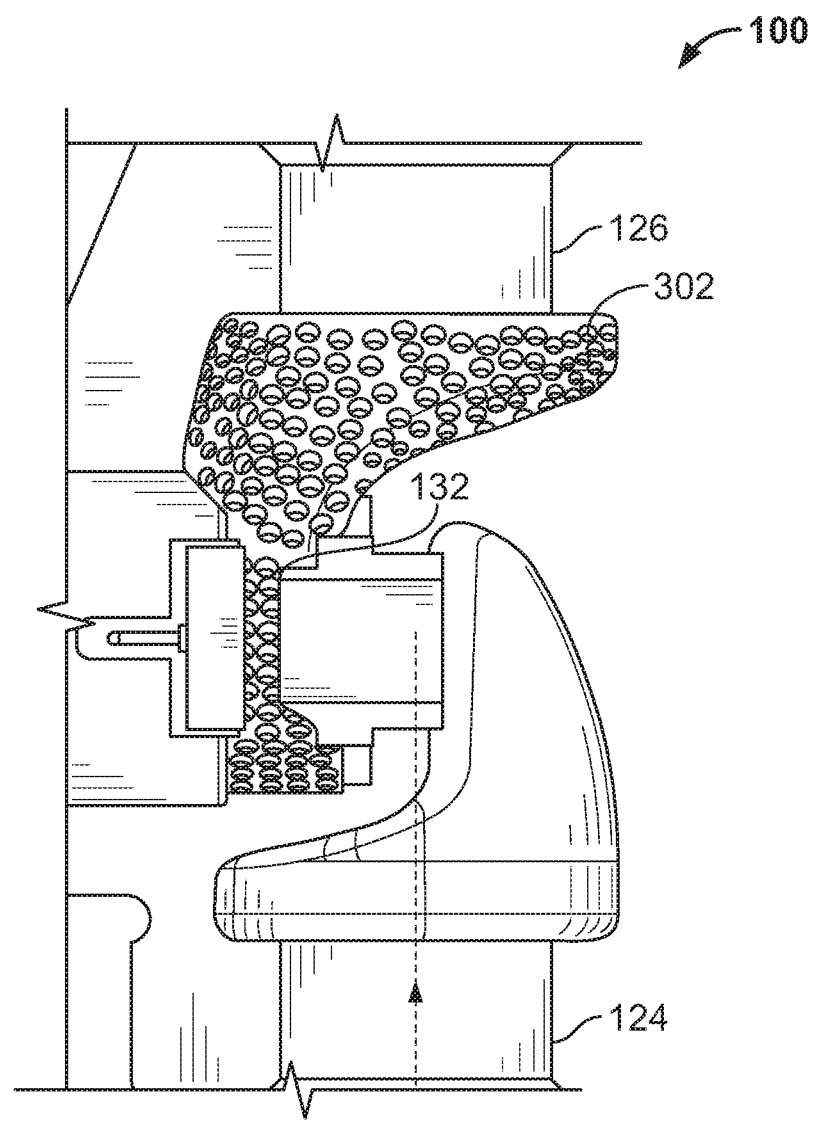
FIG. 3 shows the portion of the example fluid regulator of FIG. 1 including an example second aperture pattern defined within the example outlet flow path.

FIG. 3 shows a partial view of the example regulator 100 of FIG. 1 including example apertures 302 (e.g., recesses) that can be used to implement the example surface structures 136 of FIG. 1. In contrast to the example apertures 202 of FIG. 2, more of the apertures 302 of the example of FIG. 3 are disposed and/or defined by the outlet 126. In other words, the apertures 302 of FIG. 3 more densely populate the outlet 126 as compared to the apertures 202 of FIG. 2. In some examples, the apertures 302 are randomly dispersed within the outlet 126. In some examples, the apertures 302 increase a flow capacity through the outlet 126 by, for example, causing the velocity across a cross-section of the outlet 126 to be relatively consistent. In some examples, the apertures 302 cause a pressure and/or a pressure field across a cross-section of the outlet 126 to be relatively consistent.

Figure 4:
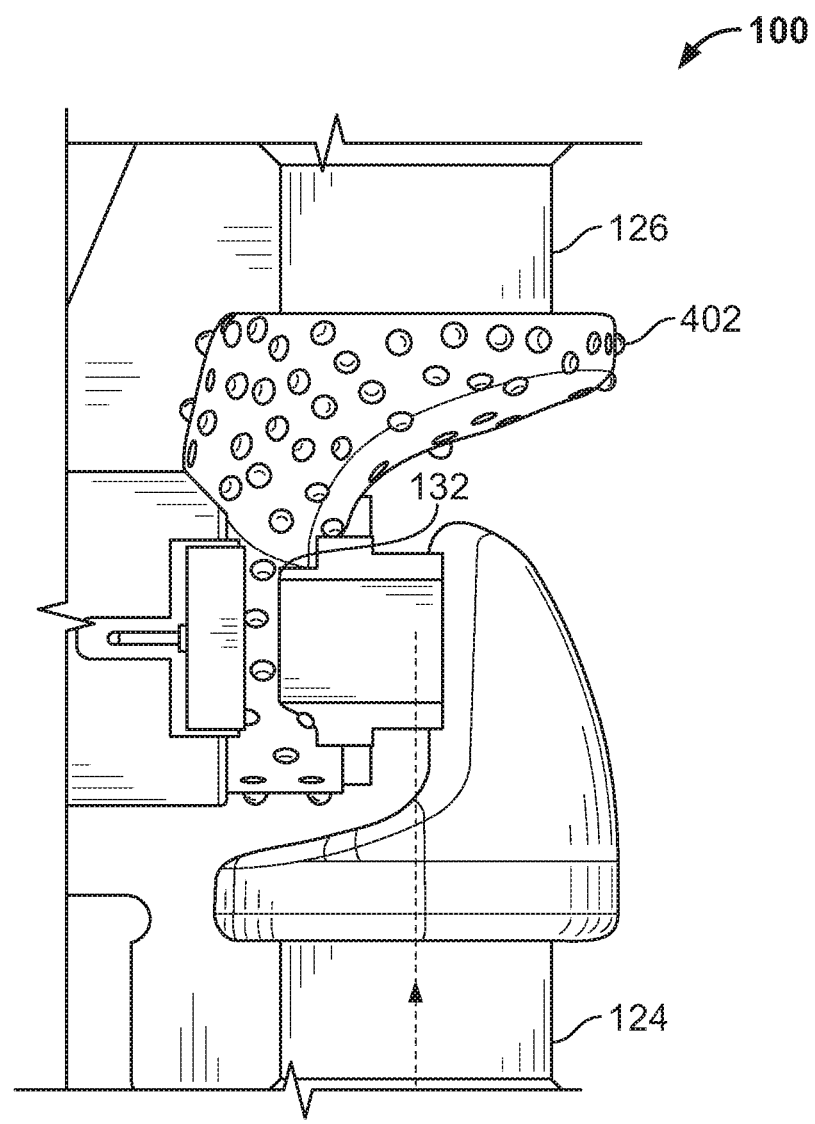
FIG. 4 shows the portion of the example fluid regulator of FIG. 1 including an example first protrusion pattern defined within the example outlet flow path.

FIG. 4 shows a partial view of the example regulator 100 of FIG. 1 including example protrusions 402 (e.g., dimples, bumps, etc.) that can be used to implement the example surface structures 136 of FIG. 1. In some examples, the protrusions 402 are randomly dispersed within the outlet 126. In some examples, the protrusions 402 change (e.g., decrease) a flow capacity through the outlet 126 by, for example, causing the velocity across a cross-section of the outlet 126 to be relatively consistent.

Figure 5:
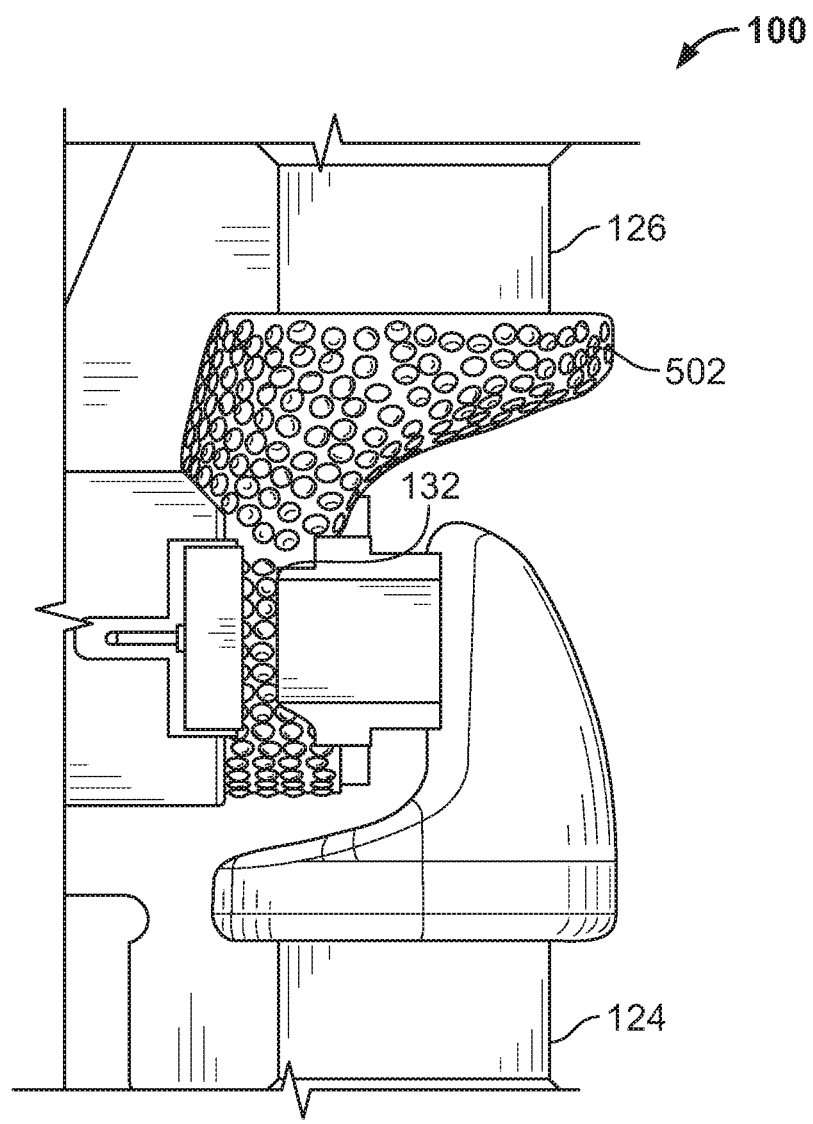
FIG. 5 shows the portion of the example fluid regulator of FIG. 1 including an example second protrusion pattern defined within the example outlet flow path.

FIG. 5 shows a partial view of the example regulator 100 of FIG. 1 including example protrusions 502 (e.g., dimples, bumps, etc.) that can be used to implement the example surface structures 136 of FIG. 1. In contrast to the example protrusions 402 of FIG. 4, more of the protrusions 502 of the example of FIG. 5 are disposed and/or defined by the outlet 126. In other words, the protrusions 502 of FIG. 5 more densely populate the outlet 126 as compared to the protrusions 402 of FIG. 4. In some examples, the protrusions 502 are randomly dispersed within the outlet 126. In some examples, the protrusions 502 may be advantageously used in connection with lower pressure drops across the orifice 131.

Figure 6:
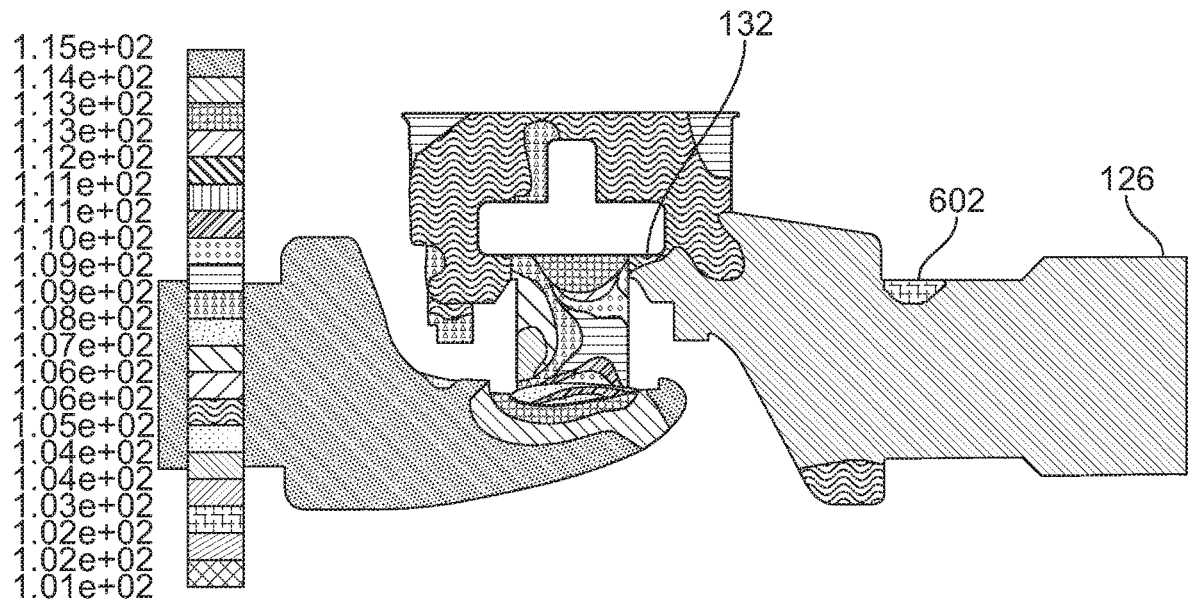
FIGS. 6-9 show example test results obtained using the examples disclosed herein.
Figure 7:
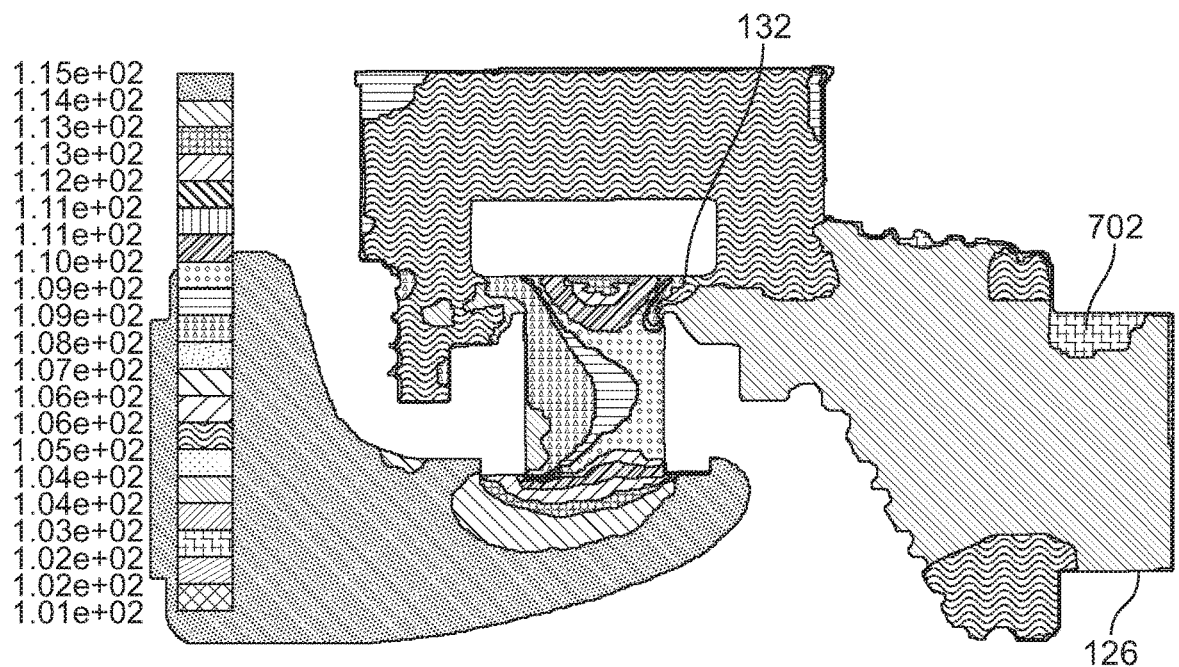
Figure 8:
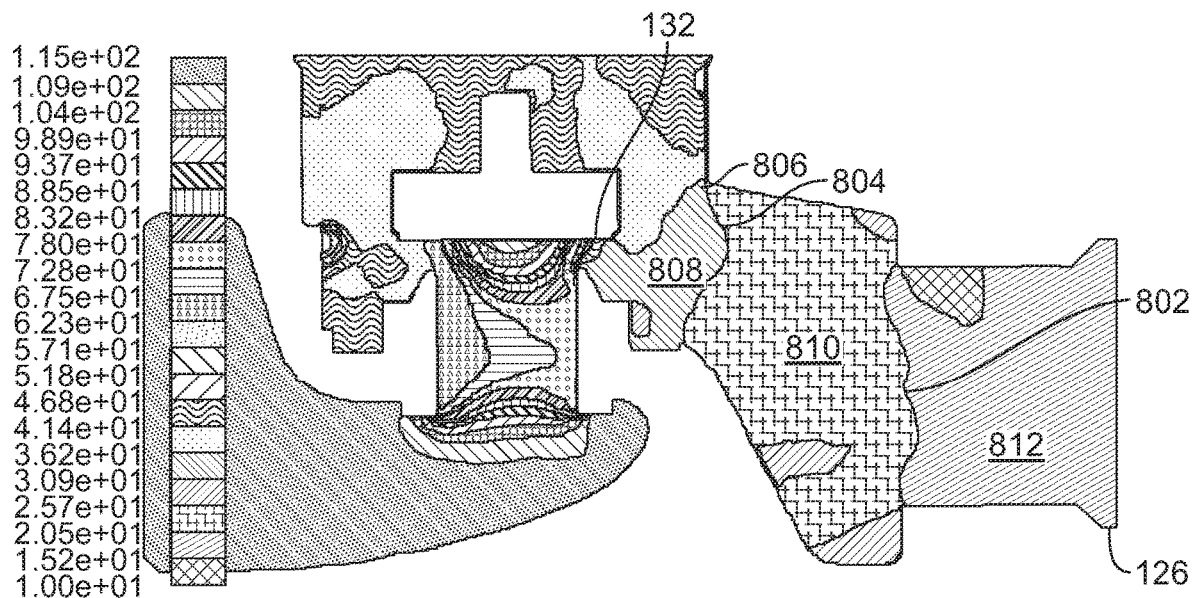

FIGS. 6-8 are pressure contour representations of regulators including example surface structures disclosed herein and regulators having an outlet with a smooth surface (e.g., no surface structures).

FIG. 6 shows results of a 10 PSI pressure drop across a regulator not including surface structures at the outlet 126 and FIG. 7 shows results of the 10 PSI pressure drop across a regulator including surface structures as disclosed herein. As shown when comparing FIGS. 6 and 7, a pressure zone 602 of FIG. 6 is relatively smaller and closer to the valve seat 132 as compared to a pressure zone 702 of FIG. 7 that is relatively larger and farther away from the valve seat 132. As used herein, the phrase "pressure zone" means an area within the outlet 126 in which the pressure is relatively consistent and/or at an expected pressure.

Figure 9:
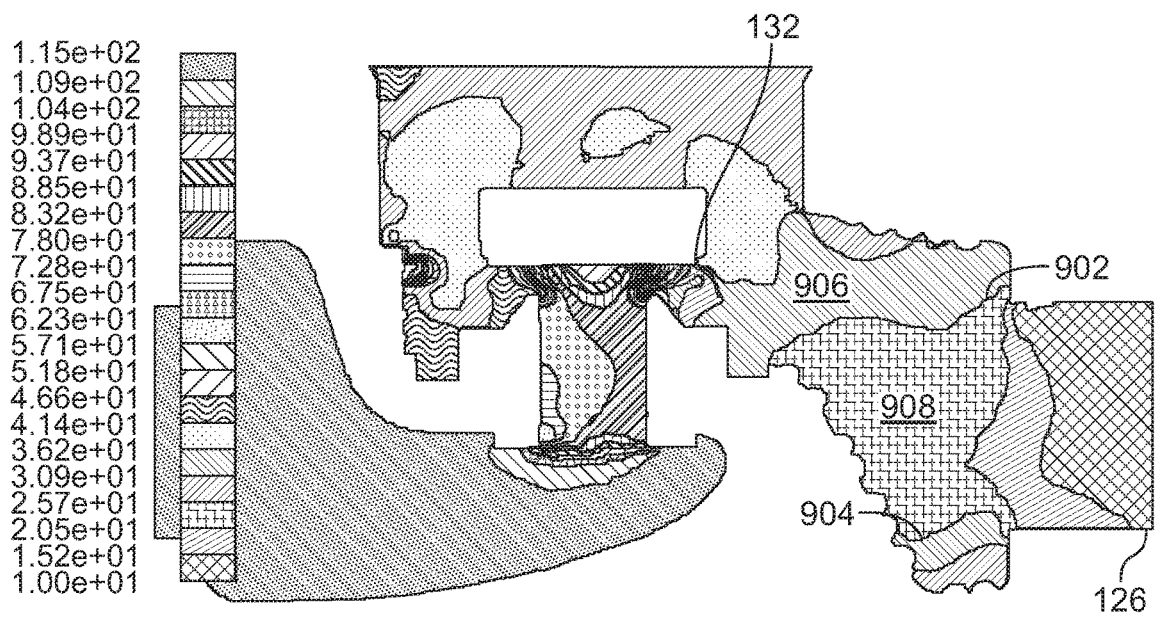

FIG. 8 shows results of a 90 PSI pressure drop across a regulator not including surface structures at the outlet 126 and FIG. 9 shows results of the 90 PSI pressure drop across a regulator including surface structures as disclosed herein. In FIG. 8, vertical pressure gradients 802, 804, 806 are present that run transverse to a longitudinal axis of the outlet 126 and define pressure zones 808, 810, 812. The pressure gradients 802, 804, 806 and, thus, the pressure zones 808, 810, 812 tend to shift as the pressure drop changes and/or based on other conditions. The movement or shifting of the vertical pressure gradients 802, 804, 806 over different pressure drops increases the difficulty of positioning the pitot tube 130 to obtain reliable measurements over a range of flow conditions and/or pressure drops across the valve seat 132. In contrast, in FIG. 9, horizontal pressure gradients 902, 904 that run along a longitudinal axis of the outlet 126 are present and define pressure zones 906, 908. The horizontal pressure gradients 902, 904 and, thus, the pressure zones 906, 908 form in locations that are relatively stable as the pressure drop across the orifice 132 changes. Thus, the horizontal pressure gradients 902, 904 enable the pitot tube 130 to be positioned in a location that obtains reliable, consistent readings regardless of the pressure drop across the orifice 132.

Figure 10:
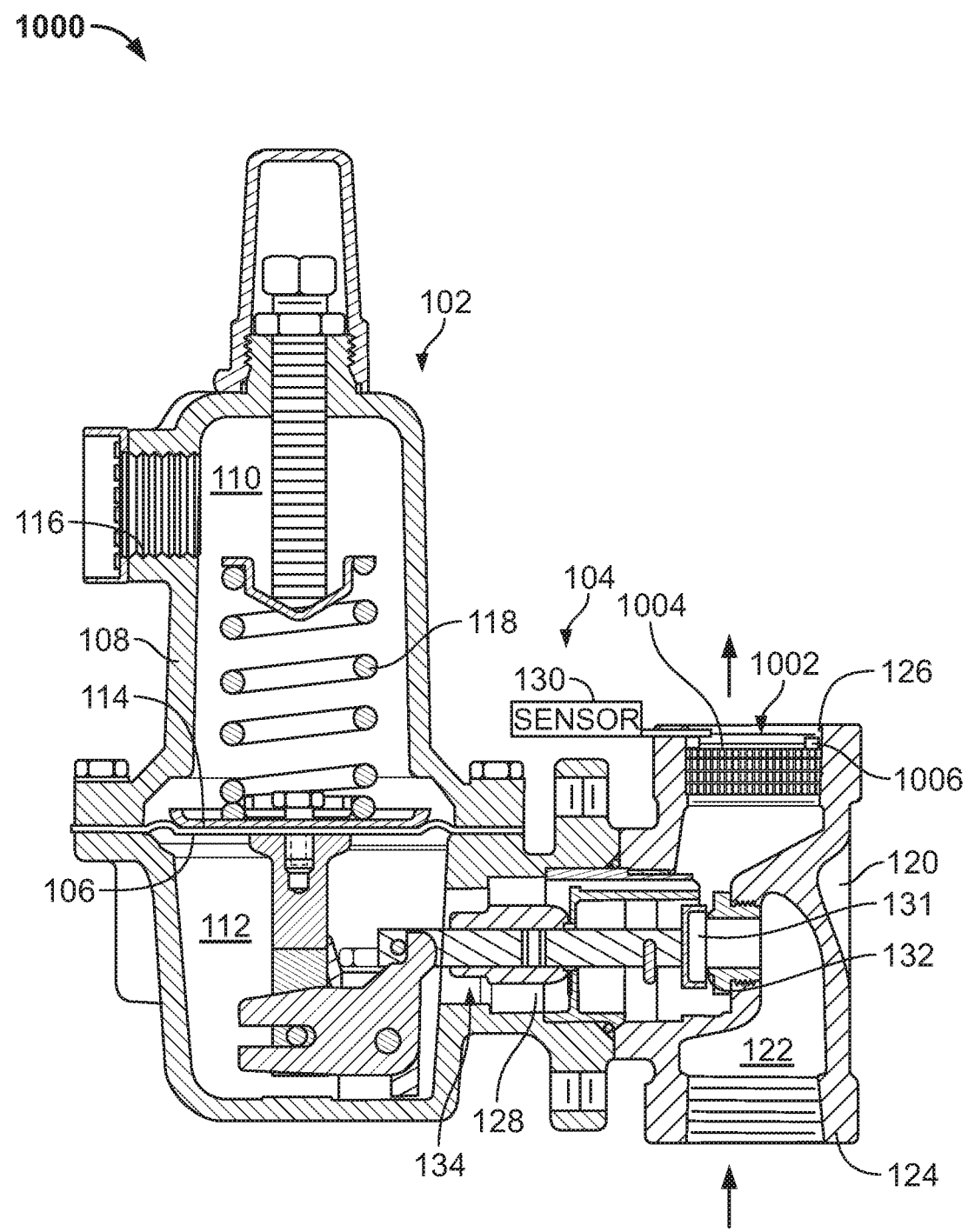
FIG. 10 shows another example fluid regulator in accordance with the teachings of this disclosure.

FIG. 10 shows another example regulator 1000 similar to the example regulator 100 of FIG. 1. However, in contrast to the example regulator 100 of FIG. 1, the example regulator 1000 of FIG. 10 includes example tubes 1002 disposed within the outlet 126 instead of the example surface structures 136. In some examples, the tubes 1002 can be implemented using a laminar flow element and may be relatively parallel to one another (e.g., between about 5 degrees of parallel). Further, the pitot tube 130 of the example regulator 1000 of FIG. 10 is disposed in a different location downstream of the tubes 1002.

In the example of FIG. 10, the tubes 1002 are coupled together with fastener(s) 1004. The fastener(s) 1004 may be straps and/or ties, etc. In this example, the outlet 126 includes a ledge 1006 against which the tubes 1002 engage and/or are coupled using one or more fasteners (e.g., bolts). In other examples, the tubes 1002 are coupled within the outlet 126 using a retaining ring(s), another faster, etc.

In operation, when fluid flows through the tubes 1002, the tubes 1002 cause the flow of fluid across a cross-section of the outlet 126 to be relatively consistent or uniform by causing the fluid to flow in substantially parallel paths through the tubes 1002, thereby substantially reducing and/or eliminating turbulence in the flow. Thus, as with the surface structures 136 disclosed in connection with FIG. 1, the tubes 1002 enable pressure zones within the outlet 126 to remain relatively stable and/or consistent and/or improve the consistency of the downstream pressure being measured by making the fluid flow across a cross-section of the outlet 126 relatively consistent.

Figure 11:
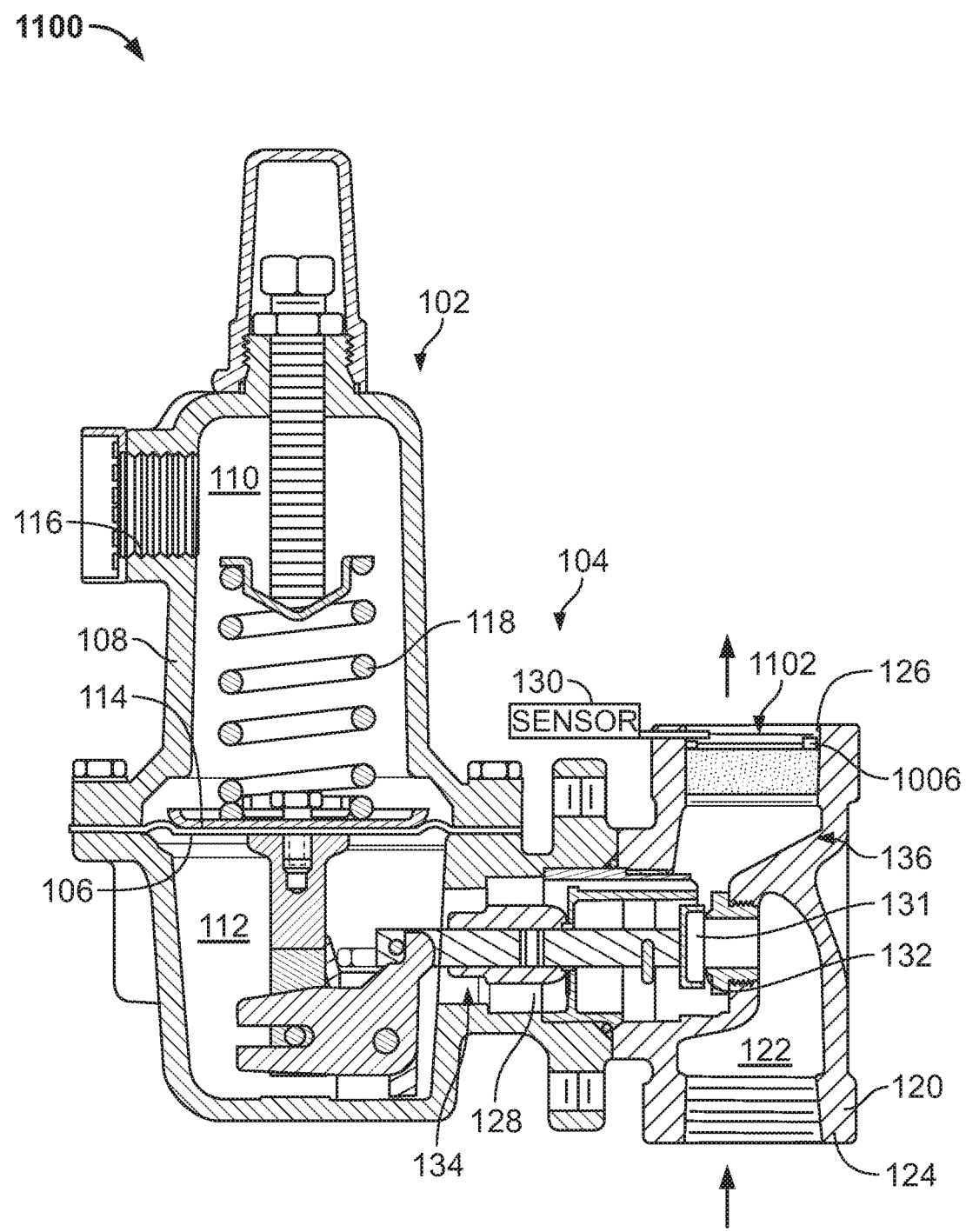
FIG. 11 shows another example fluid regulator in accordance with the teachings of this disclosure.

FIG. 11 shows another example regulator 1100 similar to the example regulator 1000 of FIG. 10. However, in contrast to the example regulator 1000 of FIG. 10, the example regulator 1100 of FIG. 11 includes a porous body 1102 disposed within the outlet 126 instead of the example tubes 1002. In some examples, the porous body 1102 is implemented using metal lattice. In this example, the outlet 126 includes the ledge 1006 against which the porous body 1102 engages and/or is coupled using one or more fasteners (e.g., bolts). In other examples, the porous body 1102 is coupled within the outlet 126 using a retaining ring(s), another fastener, etc.

In operation, when fluid flows through the porous body 1102, the porous body 1102 causes the flow of fluid across a cross-section of the outlet 126 to be relatively consistent by breaking up turbulence in the flow. For example, when the fluid flows though the porous body 1102, a pressure of the fluid flow in the middle of the outlet path increases by reducing velocity of the fluid and the pressure of the fluid flow immediately adjacent the walls of the outlet path decreases by increasing the velocity of the fluid. Thus, as with the surface structures 136 disclosed in connection with FIG. 1, the porous body 1102 enables pressure zones within the outlet 126 to remain relatively stable and/or consistent and/or improves the consistency of the downstream pressure being measured by making the fluid flow across a cross-section of the outlet 126 relatively consistent.

Figure 12:
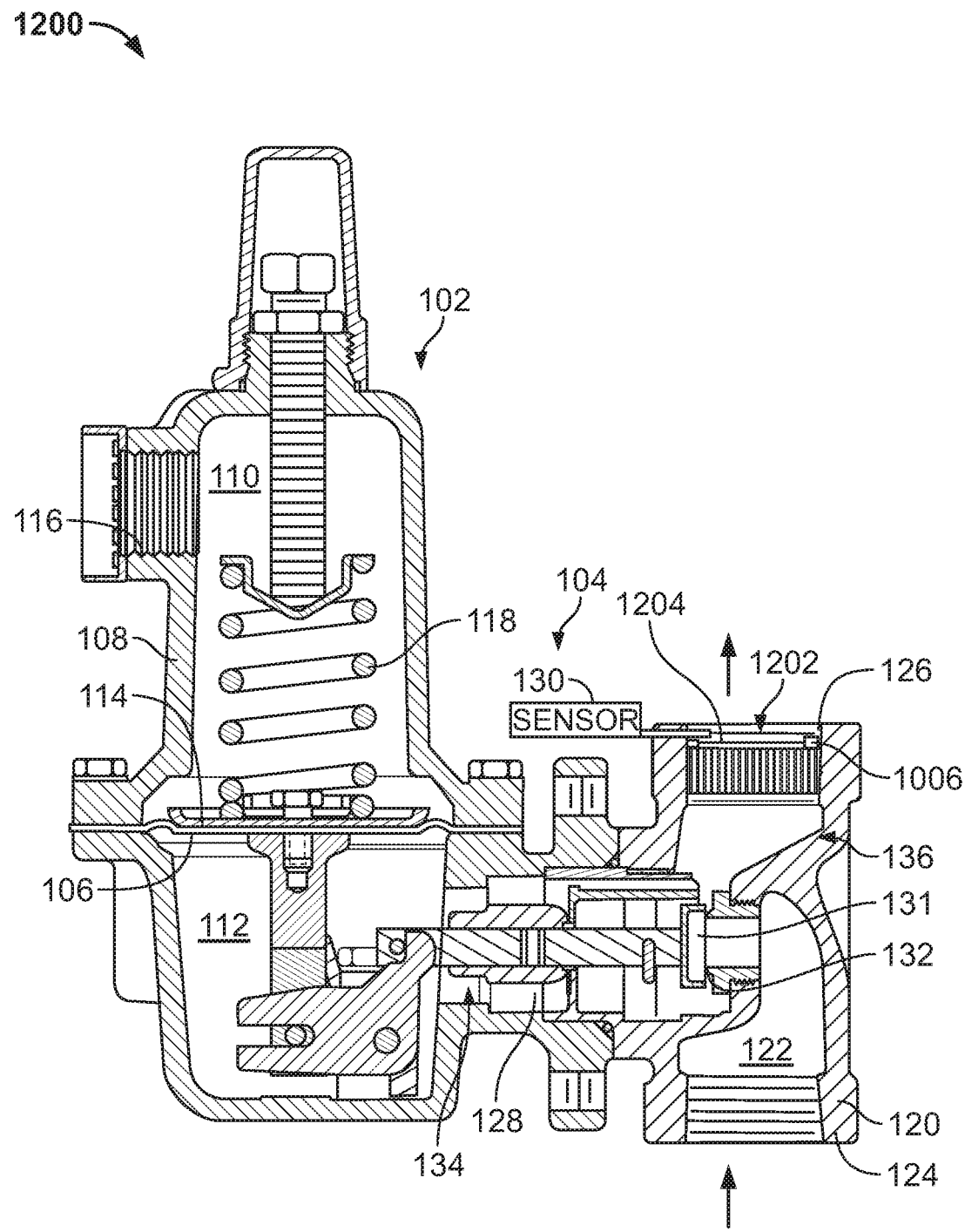
FIG. 12 shows another example fluid regulator in accordance with the teachings of this disclosure.

FIG. 12 shows another example regulator 1200 similar to the example regulator 1000 of FIG. 10. However, in contrast to the example regulator 1000 of FIG. 10, the example regulator 1200 of FIG. 12 includes a plate 1202 including a plurality of apertures 1204 disposed within the outlet 126 instead of the example tubes 1002. In some examples, the apertures 1204 are substantially parallel relative to one another (e.g., between about 5 degrees of parallel). In this example, the outlet 126 includes the ledge 1006 against which the plate 1202 engages and/or is coupled using one or more fasteners (e.g., bolts). In other examples, the porous body 1102 is coupled within the outlet 126 using a retaining ring(s), another fastener, etc.

In operation, when fluid flows through the apertures 1204, the apertures 1204 cause the fluid flow across a cross-section of the outlet 126 to be relatively consistent by causing the fluid to flow in substantially parallel paths through the apertures 1204, thereby substantially reducing and/or eliminating turbulence in the flow. Thus, as with the surface structures 136 disclosed in connection with FIG. 1, the plate 1202 and the corresponding apertures 1204 enable pressure zones within the outlet 126 to remain relatively stable and/or consistent and/or improve the consistency of the downstream pressure being measured by making the fluid flow across a cross-section of the outlet 126 relatively consistent.

From the foregoing, it will be appreciated that the above disclosed methods, apparatus and articles of manufacture relate to fluid control devices such as regulators that include a flow chamber having example surface structures that substantially increase and/or distribute turbulence within an outlet path of the fluid control device. In some examples, the surface structures substantially reduce and/or eliminate laminar flow and/or stagnation within the outlet path of the fluid control device regardless of, for example, the pressure drop across the fluid control device. In some examples, the surface structures substantially improve the consistency of the downstream pressure being measured, decrease boost and/or increase the overall capacity of the example fluid control devices implemented with the example surface structures disclosed herein.

In some examples, the example surface structures substantially disrupt, break up, or prevent turbulence within the outlet path to increase fluid flow stability. In some examples, the surface structures include example air injectors, example tube bundles, example plates with holes and/or example porous bodies may be disposed within the outlet path. Thus, in such examples, the example surface structures includes an insert such as a tube bundle, a plate with holes, etc., disposed within and/or removably coupled within the outlet path. In some examples, the surface structures substantially increase usable capacity of the fluid regulator. Some examples disclosed herein increase delivery pressure accuracy to enable more accurate consumption prediction and/or improve the efficiency of downstream components. Some examples disclosed herein enable smaller regulators to be more versatile and used in applications where larger regulators were previously required. While the examples disclosed herein teach surface structures disposed within the outlet path of a valve coupled to a fluid regulator, the example surface structures may be implemented on interior surfaces (e.g., inlet surfaces, outlet surfaces, etc.) of any fluid control device.

Using the examples disclosed herein, an example regulator may more reliably predict consumption data of downstream components, improve the efficiency of downstream components and, more generally, improve outlet flow regulation and/or enable more versatility for smaller regulators. Additionally, in some examples, providing the output path with example surface structures that stabilize the outlet flow enables the flow rate and/or flow capacity through the outlet of such regulators to increase.

As set forth herein, an example apparatus includes a valve body including an inlet, an outlet, and an aperture disposed between the inlet and the outlet, the outlet includes surface structures to increase a uniformity of a flow pattern of fluid flowing through a cross-section of the outlet. In some examples, the increase in the uniformity enables pressure gradients that are defined along a longitudinal axis of the outlet to be formed within the outlet, the pressure gradients to define a pressure zone. In some examples, a location of the pressure zone is to remain substantially consistent when different pressure drops are provided. In some examples, the apparatus includes a pitot tube having an end disposed within the pressure zone. In some examples, the increase in the uniformity is to reduce boost. In some examples, the surface structures include apertures. In some examples, the surface structures include projections. In some examples, the surface structures include texturing. In some examples, the aperture include a valve seat, and the apparatus also includes a plug to selectively engage the valve seat to control fluid flow between the inlet and the outlet. In some examples, the apparatus includes a regulator coupled to the valve body. In some examples, the surface structures include an insert disposed within the outlet.

An example apparatus includes a valve body including an inlet, an outlet, and an aperture disposed between the inlet and the outlet. The apparatus includes means for increasing a uniformity of a flow pattern of fluid flowing through a cross-section of the outlet. In some examples, the means for increasing the uniformity comprise surface structures disposed within the outlet. In some examples, the increase in the uniformity enables pressure gradients that are defined along a longitudinal axis of the outlet to be formed within the outlet, the pressure gradients to define a pressure zone. In some examples, a location of the pressure zone is to remain substantially consistent when different pressure drops are provided. In some examples, the apparatus includes a pitot tube having an end disposed within the pressure zone. In some examples, the surface structures include apertures. In some examples, the surface structures include projections. In some examples, the surface structures include texturing. In some examples, the aperture includes a valve seat, and the apparatus also includes a plug to selectively engage the valve seat to control fluid flow between the inlet and the outlet. In some examples, the apparatus include a regulator coupled to the valve body.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a valve body having an inlet and an outlet;
   a valve seat located within the valve body and positioned between the inlet and the outlet;
   closed protrusions formed by and extending along an inner wall of the valve body between the valve seat and the outlet and ending adjacent the outlet, at least one of the closed protrusions being spaced relative to others of the closed protrusions, the closed protrusions to increase a uniformity of a flow pattern of fluid flowing through a cross-section of the outlet, each of the closed protrusions having a central axis oriented perpendicularly to a corresponding surrounding portion of the inner wall; and
   a pitot tube having a sensing end located downstream from the valve seat and upstream from one or more of the closed protrusions.

2. The apparatus of claim 1, wherein the closed protrusions are convex dimples.

3. The apparatus of claim 1, wherein the closed protrusions are arranged in a random pattern.

4. The apparatus of claim 1, wherein at least one of the closed protrusions is encircled by others of the closed protrusions.

5. The apparatus of claim 1, wherein the closed protrusions provide texturing to the inner wall.

6. The apparatus of claim 1, wherein the sensing end of the pitot tube is oriented perpendicularly to a central axis of the outlet.

7. The apparatus of claim 1, wherein the closed protrusions are to increase the uniformity of the flow pattern by increasing a velocity of the fluid immediately adjacent the inner wall.

8. The apparatus of claim 1, wherein the closed protrusions are to increase the uniformity of the flow pattern by decreasing a pressure of the fluid immediately adjacent the inner wall.

9. The apparatus of claim 1, wherein the closed protrusions populate the inner wall with a density that increases the uniformity of the flow pattern of fluid flowing through the cross-section of the outlet.

10. An apparatus, comprising:
    a valve body having an inlet and an outlet;
    a valve seat located within the valve body and positioned between the inlet and the outlet;
    closed protrusions formed by and extending along an inner wall of the valve body between the valve seat and the outlet and ending adjacent the outlet, at least one of the closed protrusions being spaced relative to others of the closed protrusions; and
    a pitot tube having a sensing end located downstream from the valve seat and upstream from one or more of the closed protrusions.

11. The apparatus of claim 10, wherein each of the closed protrusions has a central axis oriented perpendicularly to a corresponding surrounding portion of the inner wall.

12. The apparatus of claim 10, wherein the closed protrusions are convex dimples.

13. The apparatus of claim 10, wherein the closed protrusions are arranged in a random pattern.

14. The apparatus of claim 10, wherein at least one of the closed protrusions is encircled by others of the closed protrusions.

15. The apparatus of claim 10, wherein the closed protrusions provide texturing to the inner wall.

16. The apparatus of claim 10, wherein the sensing end of the pitot tube is oriented perpendicularly to a central axis of the outlet.

17. The apparatus of claim 10, wherein the closed protrusions are to increase a uniformity of a flow pattern of fluid flowing through a cross-section of the outlet.

18. The apparatus of claim 17, wherein the closed protrusions are to increase the uniformity of the flow pattern by increasing a velocity of the fluid immediately adjacent the inner wall.

19. The apparatus of claim 17, wherein the closed protrusions are to increase the uniformity of the flow pattern by decreasing a pressure of the fluid immediately adjacent the inner wall.

* * * * *